(12) United States Patent
Farooq et al.

(10) Patent No.: US 11,667,257 B2
(45) Date of Patent: Jun. 6, 2023

(54) AIRBAG ASSEMBLY FOR SIDE IMPACT PROTECTION

(71) Applicant: Ford Global Technologies, LLC, Dearborn, MI (US)

(72) Inventors: S. M. Iskander Farooq, Novi, MI (US); Dean M. Jaradi, Macomb, MI (US); Mohammad Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 50 days.

(21) Appl. No.: 17/172,573

(22) Filed: Feb. 10, 2021

(65) Prior Publication Data

US 2022/0250576 A1    Aug. 11, 2022

(51) Int. Cl.
*B60R 21/231* (2011.01)
*B60R 21/213* (2011.01)
*B60R 21/00* (2006.01)

(52) U.S. Cl.
CPC ...... *B60R 21/23138* (2013.01); *B60R 21/213* (2013.01); *B60R 2021/0006* (2013.01); *B60R 2021/23107* (2013.01); *B60R 2021/23161* (2013.01)

(58) Field of Classification Search
CPC ............. B60R 21/213; B60R 21/232; B60R 21/23138; B60R 2021/0006; B60R 2021/23107
See application file for complete search history.

(56) References Cited

U.S. PATENT DOCUMENTS

| 5,273,309 | A | 12/1993 | Lau et al. |
| 5,845,935 | A * | 12/1998 | Enders ................ B60R 21/2338 280/730.2 |
| 5,957,493 | A * | 9/1999 | Larsen ................ B60R 21/2346 280/730.2 |
| 6,116,644 | A | 9/2000 | Viano et al. |
| 9,446,735 | B1 * | 9/2016 | Jayasuriya ............ B60R 21/231 |
| 9,994,181 | B1 * | 6/2018 | Dubaisi ................ B60R 21/207 |
| 10,640,076 | B2 | 5/2020 | Lee et al. |
| 11,214,222 | B2 * | 1/2022 | Bertossi ................ B60R 21/21 |
| 11,351,946 | B1 * | 6/2022 | Faruque ............ B60R 21/23138 |
| 2008/0012275 | A1 * | 1/2008 | Pinsenschaum ........ B60R 21/26 280/730.2 |
| 2016/0129875 | A1 * | 5/2016 | Massa ................ B60R 21/232 280/730.2 |

(Continued)

FOREIGN PATENT DOCUMENTS

DE    10007343 A1 *    8/2001    ........... B60R 21/231

OTHER PUBLICATIONS

T. Wohllebe, DE 100 07343 English Translation (Year: 2000).*

*Primary Examiner* — Karen Beck
(74) *Attorney, Agent, or Firm* — Frank A. MacKenzie; Bejin Bieneman PLC (57) ABSTRACT

A vehicle includes an occupant seating area and a body side having a first pillar and a second pillar disposed vehicle-forward of the first pillar. An airbag is mounted to the first pillar and inflatable to an inflated position. The airbag includes a side lobe extending from the first pillar toward the second pillar in the inflated position. The airbag includes a front lobe extending cross-vehicle from the side lobe vehicle-forward of the occupant seating area in the inflated position.

19 Claims, 8 Drawing Sheets

(56) References Cited

U.S. PATENT DOCUMENTS

| | | | | |
|---|---|---|---|---|
| 2016/0229370 | A1* | 8/2016 | Hampson | B60R 21/2334 |
| 2018/0229681 | A1* | 8/2018 | Jaradi | B60R 21/2165 |
| 2019/0071047 | A1* | 3/2019 | Zhuang | B60R 21/2338 |
| 2020/0017058 | A1* | 1/2020 | Jaradi | B60R 21/233 |
| 2021/0221323 | A1* | 7/2021 | Bertossi | B60R 21/017 |
| 2021/0245699 | A1* | 8/2021 | Adler | B60R 21/21 |
| 2021/0394702 | A1* | 12/2021 | Farooq | B60R 21/214 |

* cited by examiner

AIRBAG ASSEMBLY FOR SIDE IMPACT PROTECTION

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from the uninflated position to an inflated position.

DETAILED DESCRIPTION

A vehicle includes an occupant seating area, a body side having a first pillar and a second pillar disposed vehicle-forward of the first pillar, and an airbag mounted to the first pillar and inflatable to an inflated position. The airbag includes a side lobe extending from the first pillar toward the second pillar in the inflated position. The airbag includes a front lobe extending cross-vehicle from the side lobe vehicle-forward of the occupant seating area in the inflated position.

The side lobe in the inflated position may extend from the first pillar to the second pillar.

The front lobe may extend from the side lobe at the second pillar.

The side lobe in the inflated position may extend between the occupant seating area and the body side.

The vehicle may include a door between the first pillar and the second pillar, the side lobe in the inflated position extending between the occupant seating area and the door.

The vehicle may include a seat in the occupant seating area. The seat may include a seat back and the side lobe in the inflated position extends between the seat back and the door.

The vehicle may include a seat defining the occupant seating area. The seat may include a seat back and the side lobe extends between the seat back and the first pillar.

The occupant seating area may be between the seat back and the front lobe in the inflated position.

The vehicle may include a seat defining the occupant seating area. The seat may include a seat back. The occupant seating area may be between the seat back and the front lobe in the inflated position.

The vehicle may include an instrument panel. The front lobe in the inflated position may be between the instrument panel and the occupant seating area.

The vehicle may include an external tether extending from the first pillar to the front lobe above the seat.

The body side may include a third pillar vehicle-rearward of the first pillar, and the side lobe may extend from the first pillar toward the third pillar in the inflated position.

The side lobe in the inflated position may extends from the first pillar to the second pillar and from the first pillar to the third pillar The vehicle may include a first door between the first pillar and the second pillar and a second door between the first pillar and the third pillar.

The airbag may include a top lobe extending from the side lobe above the seat.

The top lobe may extend from the first pillar to the second pillar.

The side lobe and the front lobe may each include an inflation chamber.

The vehicle may include a door between the first pillar and the second pillar.

The front lobe may extend toward the first pillar above the occupant seating area.

The vehicle may include a seat in the occupant seating area, the seat including a seat bottom, the front lobe in the inflated position extending toward the first pillar above the seat bottom.

With reference to the Figures, wherein like numerals indicate like parts throughout the several views, an assembly for a vehicle 12 is generally shown. The vehicle 12 includes a seat 44, 46, a body side 16 having a first pillar 18 and a second pillar 20 disposed vehicle-forward of the first pillar 18, and an airbag 22 mounted to the first pillar 18 and inflatable to an inflated position. The airbag 22 includes a side lobe 26 extending from the first pillar 18 toward the second pillar 20 in the inflated position. The airbag 22 includes a front lobe 28 extending cross-vehicle from the side lobe 26 vehicle-forward of the seat 44, 46 in the inflated position.

The airbag 22 is inflatable to the inflated position, shown in FIGS. 2A-5B, to control the kinematics of a vehicle 12 occupant. When the occupant is urged in a direction toward the body side 16 or in a vehicle-forward direction, i.e., a direction having a component in the vehicle-forward direction $V_F$ identified in the figures, away from the seat 44, 46, the occupant contacts the airbag 22. Since the airbag 22 includes both the side lobe 26 extending from the first pillar 18 toward the second pillar 20 and the front lobe 28 vehicle-forward of an occupant seating area 30, the airbag 22 can control the kinematics of the occupant of the vehicle 12 from multiple directions. Specifically, in the inflated position with an occupant in the occupant seating area 30, the side lobe 26 is between the occupant and the body side 16 and the front lobe 28 is vehicle-forward of the occupant to control the kinematics of the occupant resulting from any direction of vehicle impact that urges the occupant toward the side lobe 26 and/or the front lobe 28. As one example, in a frontal vehicle impact, the occupant is urged vehicle-forward and the airbag 22 controls the occupant kinematics. As another example, in a side impact the occupant is urged cross-vehicle and the airbag 22 controls the occupant kinematics.

The vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 may include a vehicle frame and a vehicle body. The vehicle frame may be of a unibody construction in which the vehicle frame is unitary with a vehicle body (including vehicle body components as described below). As another example, the vehicle body and vehicle frame may have a body-on-frame construction (also referred to as a cab-on-frame construction) in which the vehicle body and vehicle frame are separate components, i.e., are modular, and the body is supported on and affixed to the frame. Alternatively, the frame and body may have any suitable construction. The frame and body may be of any suitable material, for example, steel, aluminum, and/or fiber-reinforced plastic, etc.

The vehicle body defines a passenger cabin 32 to house occupants, if any, of the vehicle 12. The passenger cabin 32 may extend across the vehicle 12, i.e., from one side to the other side of the vehicle 12. The passenger cabin 32 includes a front end 34 and a rear end 36 with the front end 34 being in front of the rear end 36 during forward movement of the vehicle 12.

The vehicle body includes at least two body sides 16. The vehicle body includes a floor 40 and may include a roof 42 spaced from the floor 40. The two body side 16 extend upwardly from the floor 40, e.g., from the floor 40 to the roof 42. The roof 42 and the floor 40 may each extend across the passenger cabin 32, i.e., from one body side 16 to the other body side 16 of the vehicle 12. The roof 42 may define an upper boundary of the passenger cabin 32 and the floor 40 may define a lower boundary of the passenger cabin 32. The body sides 16 may be spaced from each other cross-vehicle. The body sides 16 may define the outboard boundaries of the passenger cabin 32.

The roof 42 may include roof rails and one or more roof panels. The roof rails are spaced from one another cross-vehicle and are generally parallel to each other, i.e., parallel on a vehicle-longitudinal axis. The roof rails extend longitudinally along the vehicle body, e.g., along the fore-and-aft axis of the vehicle body. The roof panels may extend from one roof rail to the other roof rail. The roof panels may be fixed to one or more roof rails by welding, fasteners, etc.

The floor 40 may be designed to support one or more seats 44, 46. Specifically, the floor 40 may include a floor panel, and the floor panel may be designed to support the seat 44, 46. As one example, the seat 44, 46 may be a vehicle seat 44 as described below. As another example, the seat 44, 46 may be a personal mobility device 46 as described below. In the example where the seat 44, 46 is the personal mobility device 46, the floor 40 may be designed to lock one or more personal mobility devices 46 in any suitable manner.

The body side 16 includes one or more pillars 18, 20, 48. As shown in the figures, the body side 16 may include the first pillar 18 and the second pillar 20 disposed vehicle-forward of the first pillar 18. The body side 16 may include a third pillar 48 vehicle-rearward $V_R$ of the first pillar 18. Each body side 16 may include the first pillar 18, the second pillar 20, and the third pillar 48. In other words, one first pillar 18 may be disposed on one side of the vehicle 12, and the other first pillar 18 may be disposed on the other side of the vehicle 12. As an example, shown in the Figures, the first pillar 18 may be a B-pillar, the second pillar 20 may be an A-pillar, and the third pillar 48 may be a C-pillar. The pillars 18, 20, 48 may be spaced from one another on the vehicle fore-and-aft axis, i.e., on each body side 16, the first pillar 18 and the second pillar 20 are spaced from each other on the vehicle fore-and-aft axis.

The body side 16 may include door openings between each pillar, e.g., a front door opening between the first pillar 18 and the second pillar 20 and a rear door opening between the first pillar 18 and the third pillar 48. The body side 16 may receive a door 50, 52 at each door opening. As one example described further below, the vehicle 12 may include a first door 50 supported by the body side 16 between the first pillar 18 and the second pillar 20. As another example, the vehicle 12 may include a second door 52 between the first pillar 18 and the third pillar 48.

The vehicle body may include a plurality of trim panels. As an example, shown in the Figures, the body sides 16 may include at least one trim panel 54. Specifically, the trim panel 54 may cover the pillars 18, 20, 48. In other words, the trim panel 54 is between the pillar 18, 20, 48 and the interior of the passenger cabin 32. In the example where the trim covers the pillar 18, 20, 48, the trim panel 54 may include a tear seam 56 at the pillar 18, 20, 48. During inflation of the airbag 22, the tear seam 56 opens, and the airbag 22 can inflate to the inflated position.

The vehicle 12 may include the doors 50, 52 openable for occupants to enter and exit the passenger cabin 32. The roof rails contact a top edge of the doors 50, 52. Each door 50, 52 includes a door trim, a door frame, and a door panel. The door trim and the door panel are fixed relative to the door frame. The door trim is fixed opposite the door panel relative to the door frame. The door trim is inboard relative to the door frame, and the door panel is outboard relative to the door frame. The door 50, 52 includes a window and a window opening. The window opening is completely closed by the window when the window is in a fully raised position. The window opening is defined by the door trim and door panel on a bottom edge and either by the door 50, 52 circumscribing the window opening or by the vehicle body, e.g., the A pillar, the B pillar, and the roof rail. The door panel faces outboard relative to the vehicle 12. The door panel may present a class-A surface, i.e., a surface specifically manufactured to have a high-quality, finished aesthetic appearance free of blemishes. The door panel may be metal (such as steel, aluminum, etc.) or polymeric (such as fiber reinforced plastic composite, etc.). The door frame may be metal (such as steel, aluminum, etc.) or polymeric (such as fiber reinforced plastic composite, etc.). The door frame provides structural rigidity for the door panel. The door frame may provide a mounting location for components of the door 50, 52. The door trim may be a material suitable for an interior of the vehicle 12, such as vinyl, plastic, leather, wood, etc.

Figure 1:
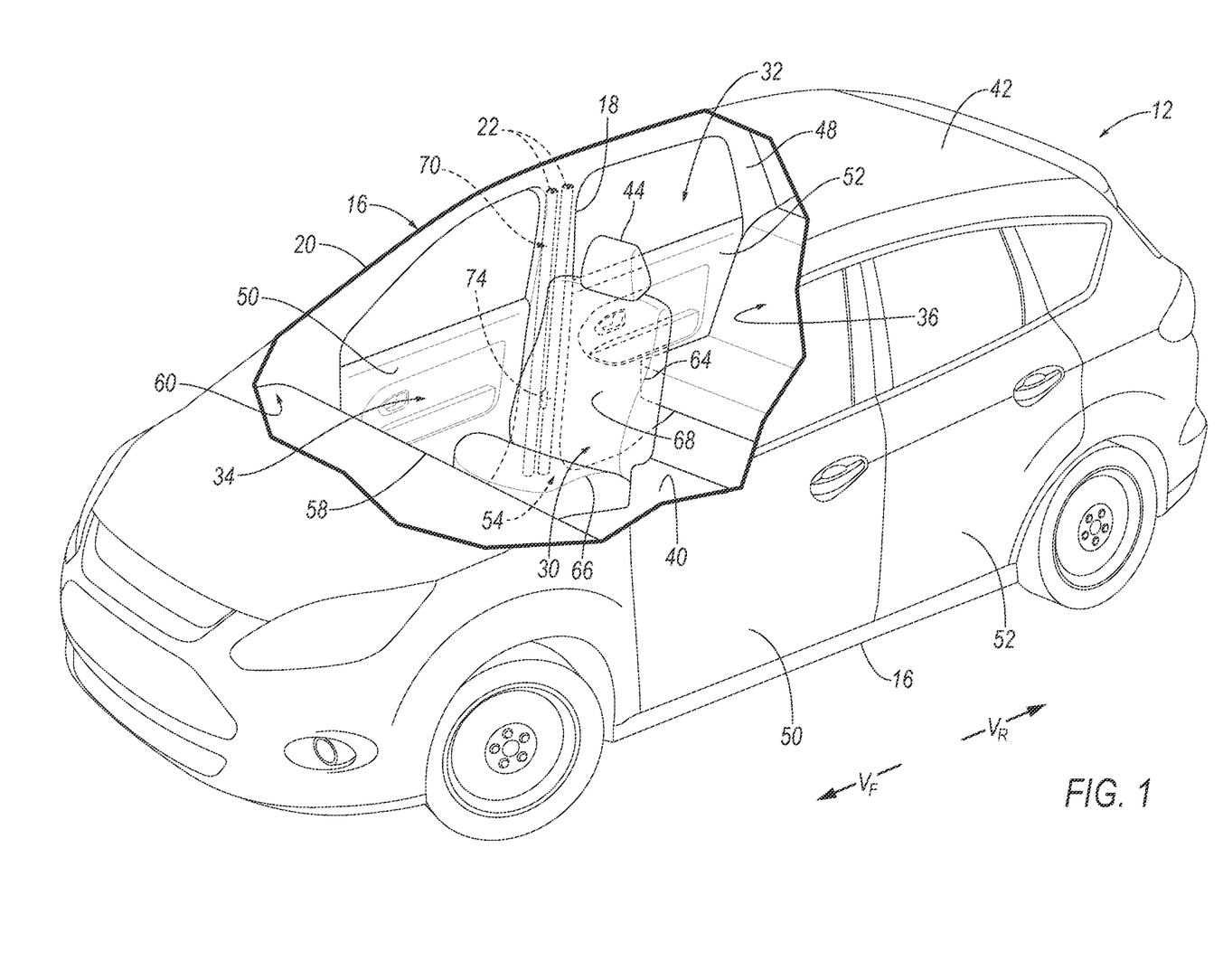
FIG. 1 is a perspective view of a vehicle partially cut-away to show an interior and an airbag in an uninflated position.
Figure 2A:
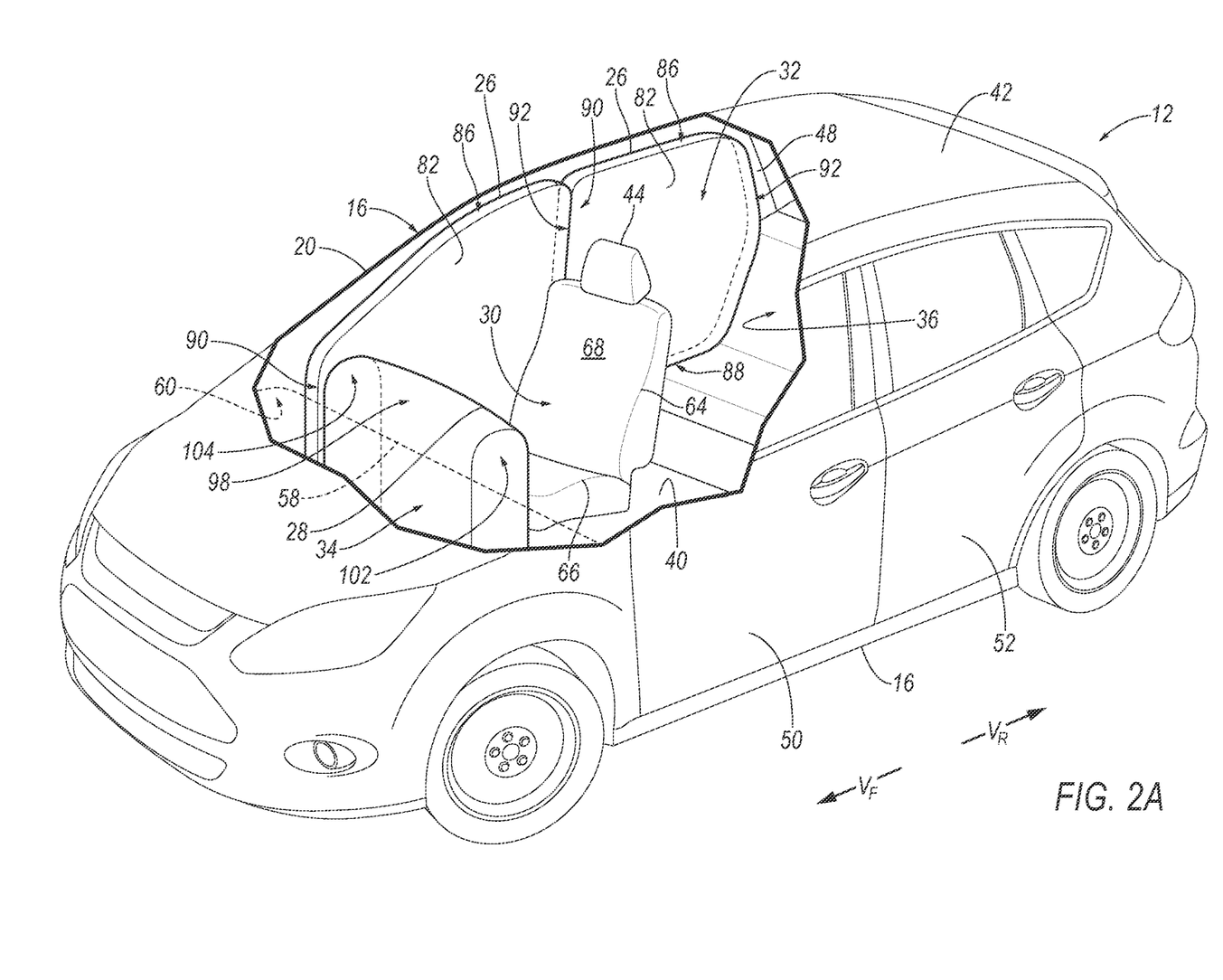
FIG. 2A is a perspective view of the vehicle with one example embodiment the airbag in the inflated position.
Figure 2B:
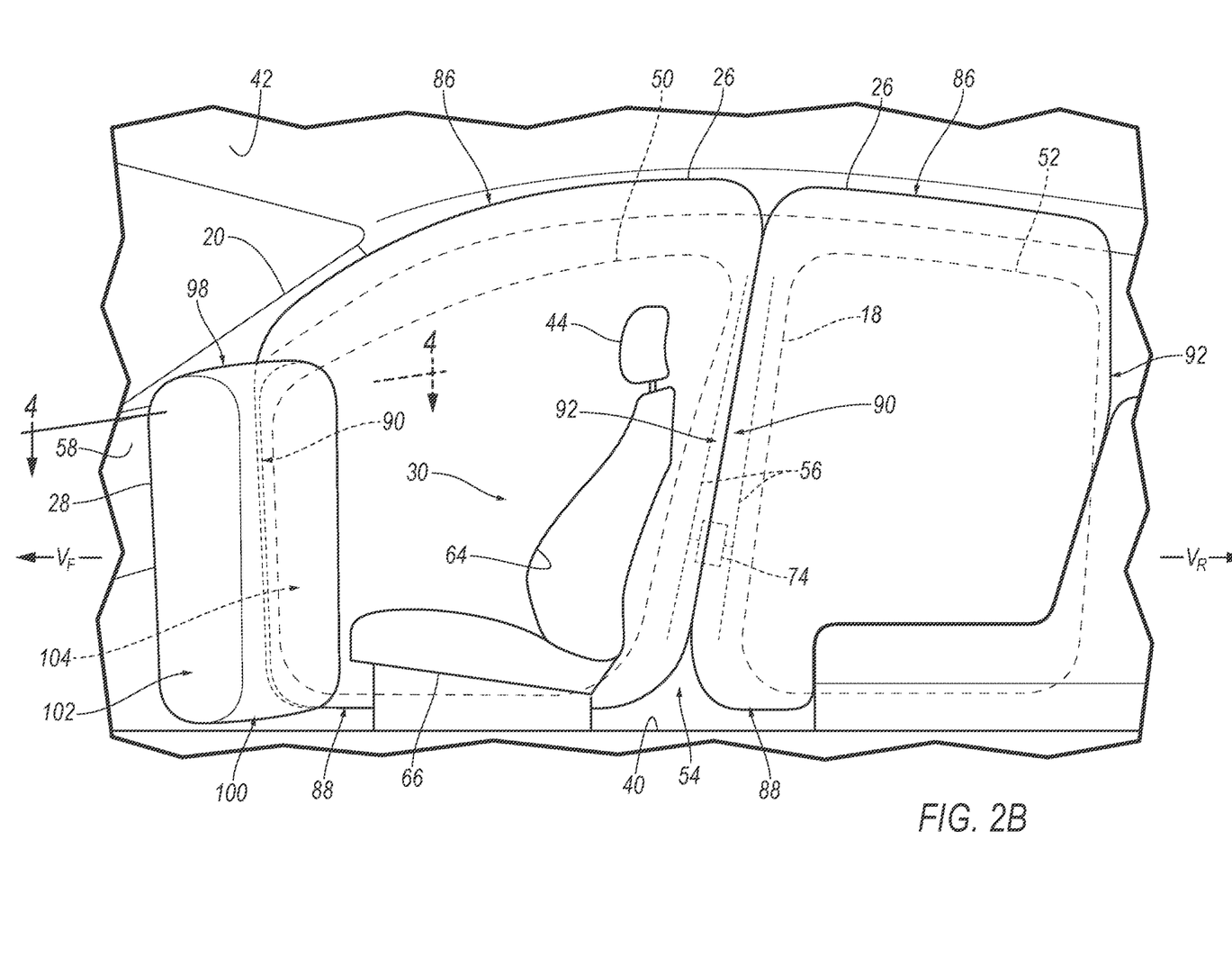
FIG. 2B is a side view of the vehicle with the example embodiment of FIG. 2A of the airbag in the inflated position.

The vehicle 12 may include an instrument panel 58 disposed at the vehicle-forward end of the passenger cabin 32, as shown in FIGS. 1 and 2. The instrument panel 58 may have a first end 60 and a second end 62. The instrument panel 58 may be elongated from the first end 60 of the instrument panel 58 to the second end 62 of the instrument panel 58. In other words, the instrument panel 58 may extend across the front end 34 of the passenger cabin 32 from one side of the vehicle 12 to the other side of the vehicle 12. As an example, shown in the Figures, the instrument panel 58 may extend from one body side 16 to the other body side 16. Specifically, the instrument panel 58 may extend from one first pillar 18 to another first pillar 18.

The instrument panel 58 may support vehicle controls such as gauges, dials, screens and information displays; heating and ventilation equipment; a radio and other electronics; etc. The instrument panel 58 may include a steering wheel. In an example where the vehicle 12 is an autonomous vehicle, the instrument panel 58 may not include a steering wheel.

With reference to FIGS. 1-5B, the vehicle 12 may include at least one seat 44, 46. Specifically, the vehicle 12 may include any suitable number of seats 44, 46. As set forth above, the seat 44, 46 may be the vehicle seat 44 or the personal mobility device 46. As shown in FIGS. 1-5B, the seats 44, 46 are supported by the vehicle floor 40. The seats 44, 46 may be arranged in any suitable arrangement in the passenger cabin 32. For example, one or more of the seats 44, 46 may be at the front end 34 of the passenger cabin 32, e.g., a driver seat and/or a passenger seat, and/or one or more of the seats 44, 46 may be at the rear end 36 of the passenger cabin.

As discussed above, the seat 44, 46 may be the vehicle seat 44. The vehicle seat 44 includes a seatback 64 and a seat bottom 66. The seatback 64 may be supported by the seat bottom 66 and may be stationary or movable relative to the seat bottom 66. The seatback 64 and the seat bottom 66 may be adjustable in multiple degrees of freedom. Specifically, the seatback 64 and the seat bottom 66 may themselves be adjustable, in other words, adjustable components within the seatback 64 and/or the seat bottom 66, and/or may be adjustable relative to each other.

The seatback 64 may include a seatback 64 frame and a covering 68 supported on the seatback 64 frame. The seatback 64 frame may include tubes, beams, etc. Specifically, the seatback 64 frame includes a pair of upright frame members. The upright frame members are elongated, and specifically, are elongated in a generally upright direction when the seatback 64 is in a generally upright position. The upright frame members are spaced from each other and the seatback 64 frame includes cross-members (not shown) extending between the upright frame members. The seatback 64 frame, including the upright frame members, may be of any suitable plastic material, e.g., carbon fiber reinforced plastic (CFRP), glass fiber-reinforced semi-finished thermoplastic composite (organosheet), etc. As another example, some or all components of the seatback 64 frame may be formed of a suitable metal, e.g., steel, aluminum, etc. The covering 68 may include upholstery and padding. The upholstery may be cloth, leather, faux leather, or any other suitable material. The upholstery may be stitched in panels around the frame. The padding may be between the covering 68 and the seatback 64 frame and may be foam or any other suitable material.

Figure 5A:
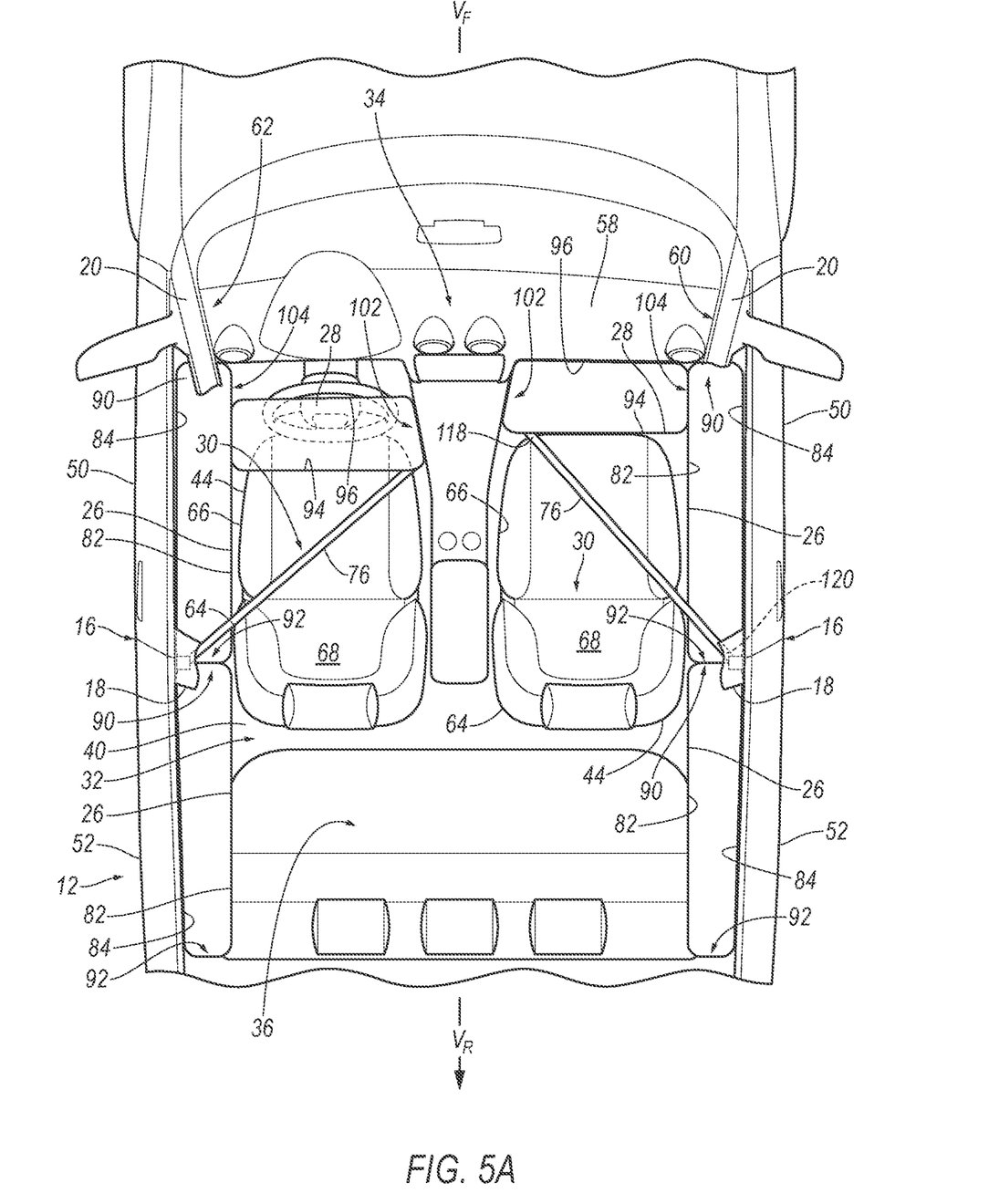
FIG. 5A is a top view of the vehicle with the airbag of FIGS. 2A and 2B in the inflated position.
Figure 5B:
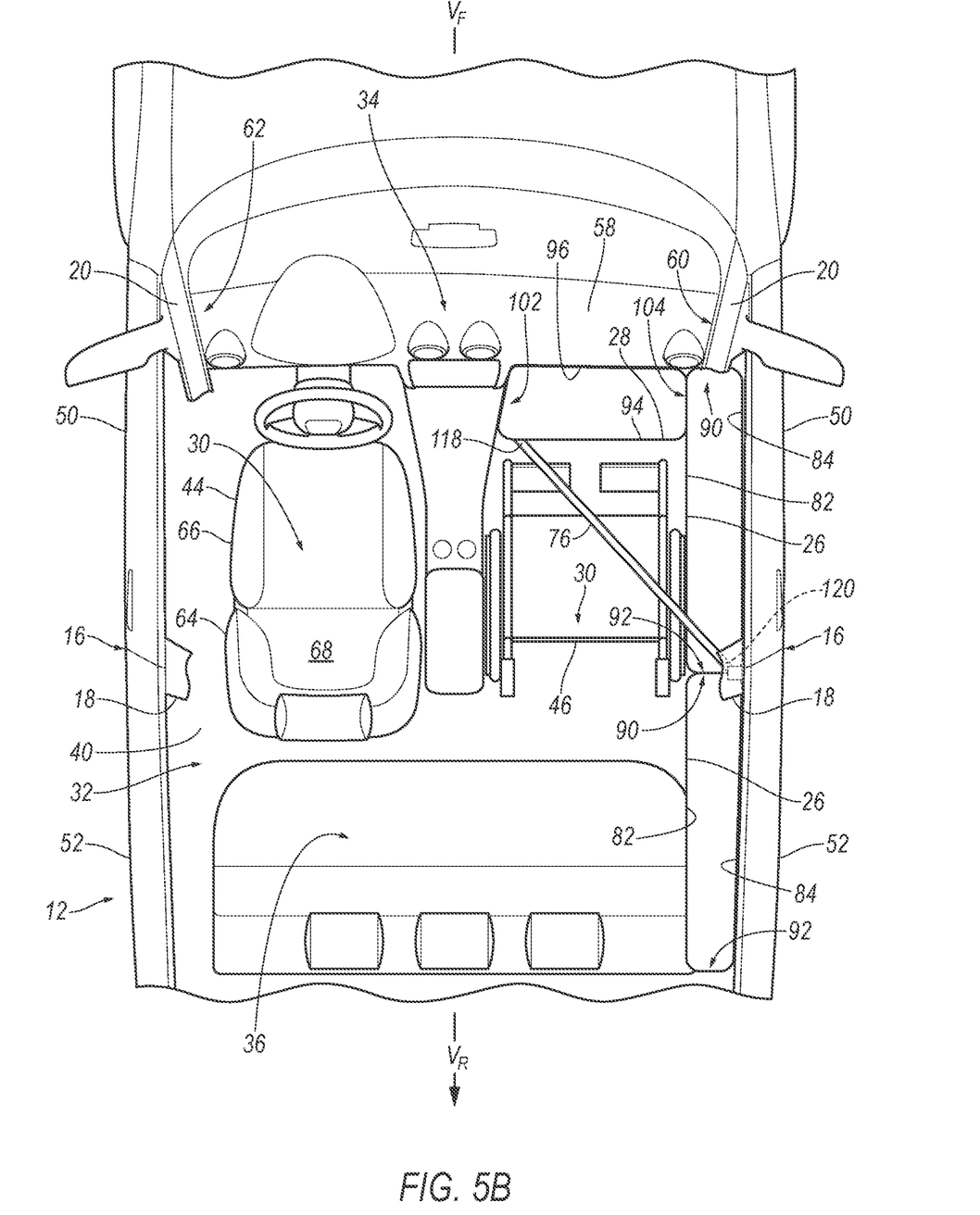
FIG. 5B is a top view of the vehicle housing a personal mobility device with the airbag of FIGS. 2A and 2B in the inflated position.

The seat 44, 46 may be a personal mobility device 46, as shown in FIG. 5B. The personal mobility device 46 may be of any suitable type that supports a seated occupant. The personal mobility device 46 transports the seated occupant outside of the vehicle 12 and moves the seated occupant in the passenger cabin 32 during ingress to and egress from the vehicle 12. The personal mobility device 46 supports the seated occupant in the passenger cabin 32 during operation of the vehicle 12. The personal mobility device 46 may include wheels. As examples including wheels, the personal mobility device 46 may be a wheelchair or a scooter. As another example, the personal mobility device 46 may include a continuous track. In such an example, the continuous track is in contact with the ground and personal mobility device 46 may include wheels that transmit torque to the continuous track.

The vehicle 12 includes at least one occupant seating area 30, as discussed above. Specifically, the occupant seating area 30 extends upwardly from the floor 40. As an example, shown in the Figures, the seat 44, 46 may be disposed in the occupant seating area 30. In examples where the vehicle seat 44 is disposed in the occupant seating area 30, the occupant seating area 30 is in a seat-forward direction of the seatback 64 and extends upwardly above the seat bottom 66. In the example, as shown in 5B, where the personal mobility device locked to the floor 40, the personal mobility device is disposed in the occupant seating area 30. Specifically, the occupant seating area 30 is in a seat-forward direction of the personal mobility device 46 and extends upwardly above the personal mobility device 46. The occupant seating area 30 is occupied by an occupant when the occupant is seated on seat 44, 46.

As described further below, the vehicle 12 includes an airbag assembly 70 supported by the body side 16. The airbag assembly 70 includes the airbag 22, and may include a housing (not numbered), an inflator 74, and an external tether 76. The airbag 22 is mounted to the first pillar 18 and inflatable to an inflated position.

The airbag 22 is mounted to the first pillar 18. Specifically, the airbag assembly 70 is mounted to the first pillar 18. The airbag 22 may be mounted to the first pillar 18 directly or indirectly. In examples where the airbag 22 is mounted to the pillar directly, any suitable type of fasteners may be used to affix the airbag 22 to the first pillar 18. In examples where the airbag 22 is mounted to the first pillar 18 indirectly, the airbag 22 may be supported by the housing with the housing being directly mounted to the first pillar 18.

The airbag 22 may include at least one lobe. For example, the airbag 22 includes the side lobe 26 and the front lobe 28. In another example, the airbag 22 may also include a top lobe 78. The airbag 22 is inflatable to the inflated position.

As shown in FIGS. 2A and 2B, the side lobe 26 extends vehicle-forward from the first pillar 18 toward the second pillar 20, and the front lobe 28 extends cross-vehicle, specifically inboard, from the side lobe 26 between the seat 44, 46 and the instrument panel 58. In the inflated position, the side lobe 26 controls the occupant kinematics when the occupant is urged toward the body side 16 in the event of a vehicle impact. In the inflated position, the front lobe 28 controls the occupant kinematics when the occupant is urged toward the forward end of the vehicle 12 in the event of a vehicle impact.

Figure 3A:
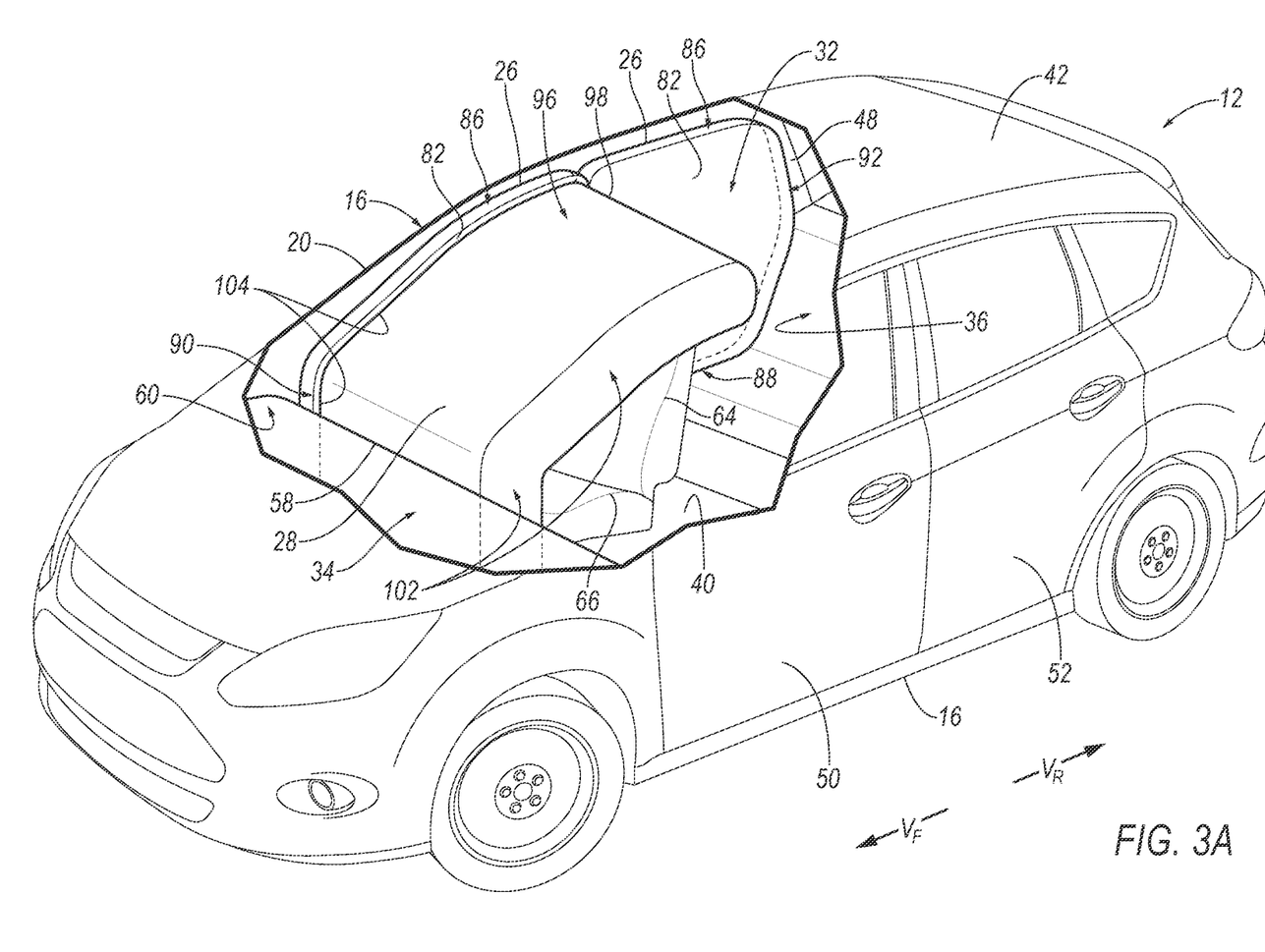
FIG. 3A is a perspective view of the vehicle with another example embodiment of the airbag in the inflated position.
Figure 3B:
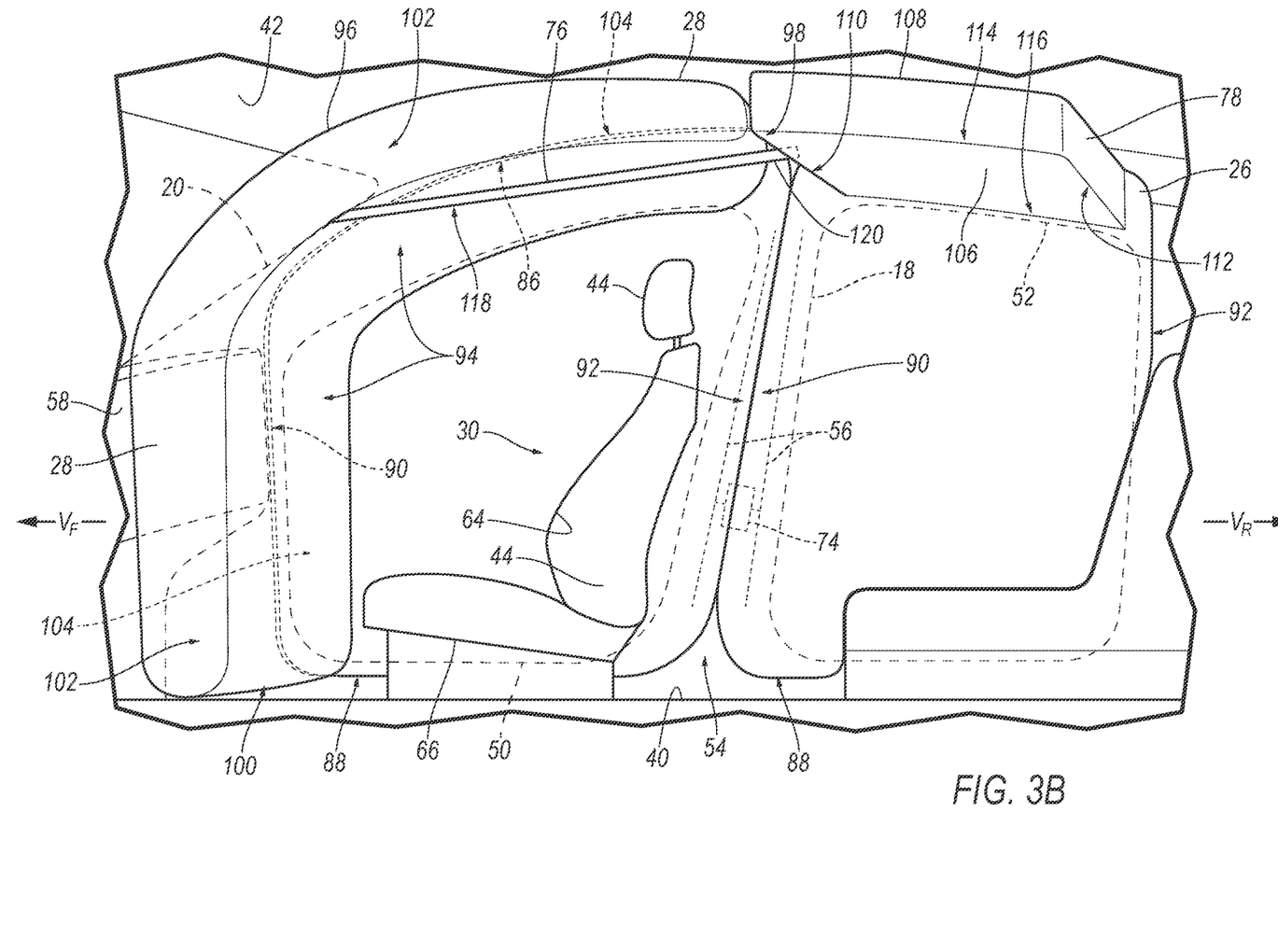
FIG. 3B is a side view of the vehicle with the example embodiment of FIG. 3A of the airbag in the inflated position and including a top lobe and an external tether.
Figure 4:
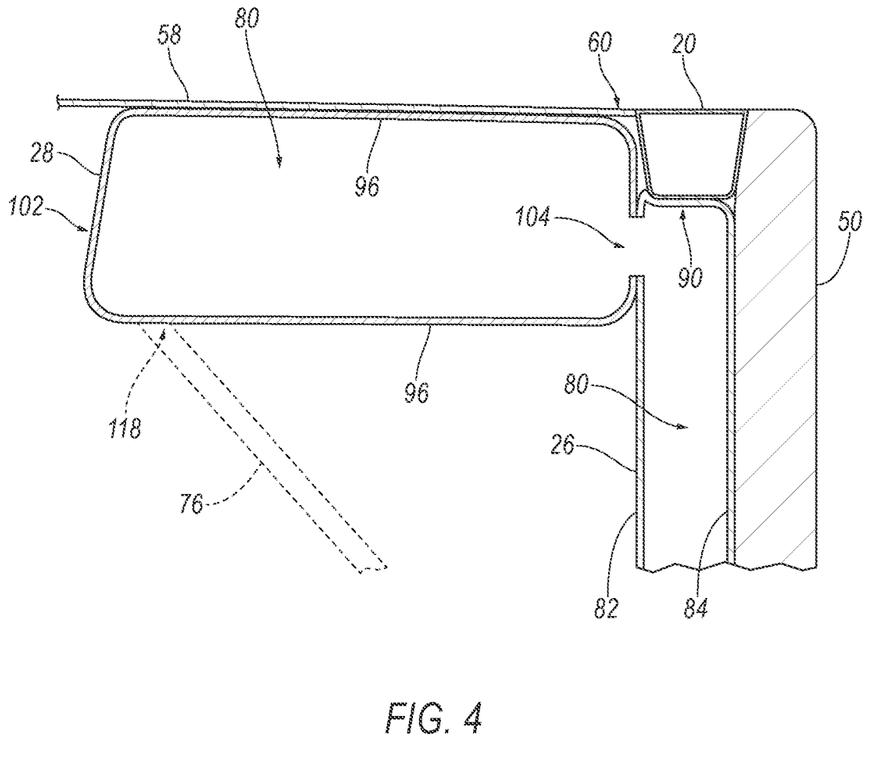
FIG. 4 is cross sectional view of FIG. 2B along line 4 in FIG. 2B.

As shown in FIG. 3B, the top lobe 78 extends from the side lobe 26 cross-vehicle above the seat 44, 46. In the inflated position, the top lobe 78 controls the occupant kinematics when the occupant is urged upwardly away from the seat bottom 66.

The lobes 26, 28, 78 each define an inflation chamber 80. The lobes 26, 28, 78, may share the inflation chamber 80. In other, words, the inflation chamber 80 is common to all three lobes 26, 28, 78 and inflation of the inflation chamber 80 inflates all three lobes 26, 28, 78 simultaneously. During inflation of the airbag 22 from the uninflated position to the inflated position, the inflation chamber 80 is filled with an inflation medium, described further below, from the inflator 74.

The airbag 22 may include a plurality of panels connected by stitching, adhesives, ultrasonic welding, fasteners, etc. As another example, the airbag 22 may include one panel and the airbag 22 is unitary, i.e., the airbag 22 is a single, uniform piece of material with no seams, joints, fasteners, or adhesives, e.g., is one-piece woven. The panels may define faces of the airbag.

The side lobe 26 may include a first face 82 and a second face 84. The side lobe 26 includes a top end 86, a bottom end 88, a vehicle-forward end 90, and a vehicle-rearward end 92.

The first face 82 and the second face 84 extend between the top end 86 and the bottom end 88, and the vehicle-forward end 90 and the vehicle-rearward end 92. The side lobe 26 terminates at the top end 86, the bottom end 88, the vehicle-forward end 90, and the vehicle-rearward end 92. In the examples shown in the Figures, the first face 82 is adjacent the occupant seating area 30 and the second face 84 abuts the door 50, 52.

The front lobe 28 may include a first face 94 and a second face 96. The front lobe 28 includes a top end 98, a bottom end 100, an inboard end 102, and an outboard end 104. The first face 94 and the second face 96 extend between the top end 98 and the bottom end 100, and the inboard end 102 and the outboard end 104. In other words, the front lobe 28 terminates at the top end 98, the bottom end 100, the inboard end 102, and the outboard end 104. Specifically, as in the examples shown in FIGS. 2A and 2B, the top end 98 may be generally aligned with the window opening. In other words, in the examples shown in FIGS. 2A and 2B, the first face 94 faces the occupant seating area 30 and the second face 96 abuts the instrument panel 58. As another example, as shown in FIGS. 3A and 3B, the top end 98 may be adjacent the first pillar 18. In other words, the first face 94 faces the occupant seating area 30 and extends over the head of the occupant, and the second face 96 abuts the instrument panel 58 and the roof 42.

The top lobe 78 may include a first face 106 and a second face 108. The top lobe 78 includes a vehicle-forward end 110, a vehicle-rearward end 112, an inboard end 114, and an outboard end 116. The first face 106 and the second face 108 extend between the vehicle-forward end 110 and the vehicle-rearward end 112, and the inboard end 114 and the outboard end 116. In other words, the top lobe 78 terminates at the vehicle-forward end 110, the vehicle-rearward end 112, the inboard end 114, and the outboard end 116. In the example shown in FIG. 3B, the first face 106 faces the occupant seating area 30 and the second face 108 abuts the roof 42. In an example not shown in the Figures, the front lobe 28 and the top lobe 78 may be connected. In this example, the second face 108 is connected to the second face 96, and the first face 106 is connected to the first face 94. The top lobe 78 and the front lobe 28 may be connected at the vehicle-forward end 110 and the top end 98. In other words, the top lobe 78 and the front lobe 28 may be continuous from the vehicle-rearward end 112 to the bottom end 100. In this example, the top lobe 78 may extend between the first pillar 18 to the second pillar 20, and the top lobe 78 may extend between the first pillar 18 and the third pillar 48.

As shown in the Figures, the front lobe 28 and the side lobe 26 may be connected. The front lobe 28 may be connected to the first face 82 of the side lobe 26 at the vehicle-forward end 90 of the side lobe 26. Specifically, the outboard end 104 of the front lobe 28 is connected to the first face 82 of the side lobe 26. In other words, in the inflated position, the side lobe 26 extends forward from the first pillar 18 toward the second pillar 20 and the front lobe 28 extends from the side lobe 26 cross-vehicle between the occupant seating area 30 and the instrument panel 58.

The front lobe 28 and the side lobe 26 may be connected in any suitable way, e.g., stitching, adhesives, ultrasonic welding, etc. The front lobe 28 and the side lobe 26 may be in fluid communication with each other. In other words, the inflation medium can move freely between the side lobe 26 and the front lobe 28.

As shown in FIG. 3B, the top lobe 78 and the side lobe 26 may be connected. The top lobe 78 may be connected at the top end 86 of the side lobe 26. Specifically, the outboard end 116 of the top lobe 78 is connected to the top end 86 of the side lobe 26.

The top lobe 78 and the side lobe 26 may be connected in any suitable way, e.g., stitching, adhesives, ultrasonic welding, etc. The top lobe 78 and the side lobe 26 may be in fluid communication with each other. In other words, the inflation medium can move freely between the side lobe 26 and the top lobe 78.

The airbag 22 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The side lobe 26 extends from the first pillar 18 toward the second pillar 20 in the inflated position. In the example shown in the figures, the side lobe 26 extends from the first pillar 18 to the second pillar 20. In the inflated position, the vehicle-rearward end 92 of the side lobe 26 is supported by the first pillar 18 and the vehicle-forward end 90 of the side lobe 26 is adjacent to or abuts the second pillar 20.

In addition to or in the alternative to extending from the first pillar 18 toward the second pillar 20, the side lobe 26 may extend from the first pillar 18 toward the third pillar 48 in the inflated position. In the example shown in the figures, the side lobe 26 extends from the first pillar 18 to the third pillar 48. In example shown in the figures, the vehicle-forward end 90 of the side lobe 26 is supported by the first pillar 18 and the vehicle-rearward end 92 of the side lobe 26 is adjacent to or abuts the third pillar 48.

The side lobe 26 in the inflated position extends between the seat 44, 46 and the body side 16. As shown in the Figures, in the inflated position, the first face 82 of the side lobe 26 faces the occupant seating area 30 and the second face 84 of the side lobe 26 faces the body side 16. Specifically, the first face 82 of the side lobe 26 faces the vehicle seat 44 or the personal mobility device 46 and the second face 84 of the side lobe 26 faces the door 50, 52. As discussed above, the first face 82 and the second face 84 of the side lobe 26 extend from the vehicle-rearward end 92 to the vehicle-forward end 90. In other words, the side lobe 26 in the inflated position extends between the seat 44, 46 and the door 50, 52.

As discussed above the vehicle seat 44 and the personal mobility device 46 may be adjustable relative to the passenger cabin 32. When the vehicle seat 44 or the personal mobility device 46 is adjusted or moved by the occupant, the components of the vehicle seat 44 or the personal mobility device 46 are moved relative to the passenger cabin 32 and/or other vehicle body components. As one example, when the vehicle seat 44 is adjusted forward, i.e., to be closer to the instrument panel 58, the seatback 64 may be adjacent the door 50, 52 and the side lobe 26 in the inflated position extends between the seatback 64 and the door 50, 52. As another example, when the vehicle seat 44 is adjusted rearward, i.e., to be further from the instrument panel 58, the seatback 64 may be adjacent the first pillar 18 and the side lobe 26 extends between the seatback 64 and the first pillar 18.

As shown in the Figures, the airbag 22 may include the front lobe 28 extending cross-vehicle from the side lobe 26 vehicle-forward of the seat 44, 46 in the inflated position. Specifically, the front lobe 28 may extend across the vehicle 12 from the first face 82 of the side lobe 26 at the vehicle-forward end 90 of the side lobe 26. In other words, the front lobe 28 extends from the side lobe 26 away from the body side 16 at the second pillar 20 in the inflated position.

As shown in the figures, the front lobe 28 in the inflated position may be between the instrument panel 58 and the seat 44, 46. As an example, shown in FIGS. 2A and 2B, the second face 96 of the front lobe 28 may face the instrument panel 58 and the first face 94 of the front lobe 28 may face the seat 44, 46. The seat 44, 46 may include the occupant seating area 30 between the seatback 64 and the first face 94 of the front lobe 28 in the inflated position. In other words, the occupant seating area 30 is between the seatback 64 and the front lobe 28 in the inflated position.

As another example, shown in FIGS. 3A and 3B, the second face 96 of the front lobe 28 may face the instrument panel 58 and the roof 42, and the first face 94 of the front lobe 28 may face the seat 44, 46 and the occupant seating area 30. The seat 44, 46 may include the occupant seating area between the seatback 64, the seat bottom 66, and the first face 94 of the front lobe 28 in the inflated position. In other words, the occupant seating area 30 is between the seatback 64 and the front lobe 28, and below the first face 94 in the inflated position.

As discussed above, in in the example embodiment shown in FIG. 3B, the airbag 22 can include the top lobe 78 extending from the side lobe 26 above the seat 44, 46. The top lobe 78 may extend from the side lobe 26 across the vehicle 12 along the roof 42. In other words, the top lobe 78 may extend over the head of the occupant. The top lobe 78 may extend from the first pillar 18 to the third pillar 48. In other examples, not shown in the figures, the top lobe 78 may extend between the first pillar 18 and the third pillar 48. In other words, in examples not shown in the figures, the top lobe 78 may extend partially between the first pillar 18 and the third pillar 48. The top lobe 78 may be connected to the side lobe 26 in any suitable manner, e.g., stitching, adhesives, ultrasonic welding, etc. The top lobe 78 may be in fluid communication with the side lobe 26 in the inflated position.

The airbag assembly 70 includes the inflator 74. The inflator 74 is in fluid communication with the airbag 22. The inflator 74 expands the airbag 22 with inflation medium, such as a gas, to move the airbag 22 from the uninflated position to the inflated position. The inflator 74 may be supported by any suitable component. For example, the inflator 74 may be supported by the housing. The inflator 74 may be, for example, a pyrotechnic inflator 74 that ignites a chemical reaction to generate the inflation medium, a stored gas inflator 74 that releases (e.g., by a pyrotechnic valve) stored gas as the inflation medium, or a hybrid. The inflator 74 may be, for example, at least partially in the inflation chamber 80 to deliver inflation medium directly to the inflation chamber 80 or may be connected to the inflation chamber 80 through fill tubes, diffusers, etc.

As shown in FIGS. 3B-5B, the airbag assembly 70 may include the external tether 76 extending from the first pillar 18 to the front lobe 28. The external tether 76 may have a first end 118 and a second end 120. The first end 118 or the second end 120 may be connected to the first pillar 18 above the seat 44, 46, and the other of the first end 118 or the second end 120 may be connected to the top side of the front lobe 28. The airbag 22 may include any suitable number of external tethers 76, i.e., one or more. The external tether 76 may be fabric, rope, wire, etc., and may be connected at the first end 118 and the second end 120 in any suitable way.

The disclosure has been described in an illustrative manner, and it is to be understood that the terminology which has been used is intended to be in the nature of words of description rather than of limitation. The use of numerical identifiers, e.g., first, second, third, are intended to be used as identifiers rather than of limitation. Many modifications and variations of the present disclosure are possible in light of the above teachings, and the disclosure may be practiced otherwise than as specifically described.

The invention claimed is:

1. A vehicle comprising:
a seat;
an occupant seating area;
a body side having a first pillar and a second pillar disposed vehicle-forward of the first pillar; and
an airbag mounted to the first pillar and inflatable to an inflated position;
the airbag including a side lobe extending from the first pillar toward the second pillar in the inflated position;
the airbag including a front lobe vehicle-forward of the occupant seating area in the inflated position, the front lobe extending from the side lobe cross-vehicle beyond the seat in the inflated position;
the airbag including a top lobe extending from the side lobe above the seat; and
the top lobe extending from the first pillar to the second pillar.

2. The vehicle as set forth in claim 1, wherein the side lobe in the inflated position extends from the first pillar to the second pillar.

3. The vehicle as set forth in claim 2, wherein the front lobe extends from the side lobe at the second pillar.

4. The vehicle as set forth in claim 1, wherein the side lobe in the inflated position extends between the occupant seating area and the body side.

5. The vehicle as set forth in claim 4, further comprising a door between the first pillar and the second pillar, the side lobe in the inflated position extending between the occupant seating area and the door.

6. The vehicle as set forth in claim 5, further comprising a seat in the occupant seating area, the seat including a seat back and the side lobe in the inflated position extends between the seat back and the door.

7. The vehicle as set forth in claim 1, further comprising a seat defining the occupant seating area, the seat including a seat back and the side lobe extends between the seat back and the first pillar.

8. The vehicle as set forth in claim 7, wherein the occupant seating area is between the seat back and the front lobe in the inflated position.

9. The vehicle as set forth in claim 1, further comprising a seat defining the occupant seating area, the seat including a seat back, the occupant seating area being between the seat back and the front lobe in the inflated position.

10. The vehicle as set forth in claim 1, further comprising an instrument panel, the front lobe in the inflated position being between the instrument panel and the occupant seating area.

11. The vehicle as set forth in claim 1, further comprising an external tether extending from the first pillar to the front lobe above the seat.

12. The vehicle as set forth in claim 1, wherein the body side includes a third pillar vehicle-rearward of the first pillar, and the side lobe extends from the first pillar toward the third pillar in the inflated position.

13. The vehicle as set forth in claim 12, wherein the side lobe in the inflated position extends from the first pillar to the second pillar and from the first pillar to the third pillar.

14. The vehicle as set forth in claim 12, further comprising a first door between the first pillar and the second pillar and a second door between the first pillar and the third pillar.

15. The vehicle as set forth in claim 1, wherein the side lobe and the front lobe each include an inflation chamber.

16. The vehicle as set forth in claim 1, further comprising a door between the first pillar and the second pillar.

17. The vehicle as set forth in claim 1, wherein the front lobe extends toward the first pillar above the occupant seating area.

18. The vehicle as set forth in claim 17, further comprising a seat in the occupant seating area, the seat including a seat bottom, the front lobe in the inflated position extending toward the first pillar above the seat bottom.

19. A vehicle comprising:
a floor;
a seat supported on the floor;
an occupant seating area;
a body side having a first pillar and a second pillar disposed vehicle-forward of the first pillar; and
an airbag mounted to the first pillar and inflatable to an inflated position;
the airbag including a side lobe extending from the first pillar toward the second pillar in the inflated position;
the airbag including a front lobe vehicle-forward of the occupant seating area in the inflated position, the front lobe extending from the side lobe cross-vehicle beyond the seat in the inflated position; and
the front lobe having a top end, the front lobe extending from the top end toward the floor.

* * * * *